(12) United States Patent
Valladares et al.

(10) Patent No.: US 9,884,348 B2
(45) Date of Patent: Feb. 6, 2018

(54) CLEANING SYSTEMS DEVICES AND PROCESSES

(71) Applicants: Rodolfo E Valladares, Rochester, NY (US); Suyana Villarroel, Rochester, NY (US); David B Montfort, Webster, NY (US)

(72) Inventors: Rodolfo E Valladares, Rochester, NY (US); Suyana Villarroel, Rochester, NY (US); David B Montfort, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1176 days.

(21) Appl. No.: 13/931,950

(22) Filed: Jun. 30, 2013

(65) Prior Publication Data

US 2015/0001158 A1 Jan. 1, 2015

(51) Int. Cl.
*B08B 1/00* (2006.01)
*C02F 1/44* (2006.01)
*C02F 1/52* (2006.01)
*C02F 1/66* (2006.01)
*C02F 101/30* (2006.01)
*C02F 101/32* (2006.01)

(52) U.S. Cl.
CPC .............. *B08B 1/00* (2013.01); *C02F 1/444* (2013.01); *C02F 1/5245* (2013.01); *C02F 1/66* (2013.01); *C02F 2101/308* (2013.01); *C02F 2101/325* (2013.01); *C02F 2209/06* (2013.01)

(58) Field of Classification Search
CPC ...... G01N 27/38; G01N 21/15; G01N 21/152; B41J 29/17; B01D 33/466; B01D 33/468; B01D 33/48; B01D 29/6415; B01D 29/6476; B01D 29/66; B01D 2201/583
See application file for complete search history.

(56) References Cited

U.S. PATENT DOCUMENTS

| | | | | |
|---|---|---|---|---|
| 950,118 | A * | 2/1910 | Rood | B01D 29/118 210/107 |
| 3,155,603 | A * | 11/1964 | Hart | G01N 27/302 204/279 |
| 3,216,915 | A * | 11/1965 | Arthur | G01N 27/38 204/402 |
| 3,225,661 | A * | 12/1965 | Smyser | G01F 1/06 418/112 |
| 4,285,792 | A * | 8/1981 | McGandy | G01N 27/38 204/402 |
| 5,080,788 | A * | 1/1992 | Chen | B01D 29/33 15/246 |

(Continued)

OTHER PUBLICATIONS

S. Aslanidou1, N. Lydakis-Simantiris1 , C. Kotsifaki2, D. Pentari3 and E. Katsivela1; Ferric Chloride (FeCl3) As Regulatory Agent for the Reduction of Hydrogen Sulfide (H2S) in Municipal Wastewater; Mar. 22, 2009; pp. 1-3.*

(Continued)

*Primary Examiner* — Dirk R Bass
*Assistant Examiner* — Donovan Bui-Huynh
(74) *Attorney, Agent, or Firm* — Eugene O. Palazzo (57) ABSTRACT

A cleaning system that includes a meter operatively connected to a cleaning device, and where the flow of waste water activates the cleaning device, and which device removes contaminates from the meter.

18 Claims, 4 Drawing Sheets

(56) References Cited

U.S. PATENT DOCUMENTS

| | | | | |
|---|---|---|---|---|
| 5,474,664 A | * | 12/1995 | Thompson | G01N 27/38 204/400 |
| 2003/0233723 A1 | * | 12/2003 | Lizotte | G01N 21/15 15/250.001 |
| 2004/0060576 A1 | * | 4/2004 | Cronin | B08B 3/02 134/7 |
| 2005/0161392 A1 | * | 7/2005 | Duby | B01D 25/26 210/407 |
| 2010/0321046 A1 | * | 12/2010 | Randall | G01N 27/07 324/696 |
| 2011/0200363 A1 | * | 8/2011 | Gilan | B41J 2/17513 399/237 |
| 2011/0252551 A1 | * | 10/2011 | Zhang | B08B 1/00 4/309 |
| 2012/0074074 A1 | * | 3/2012 | Lean | B01D 29/6415 210/798 |
| 2013/0081653 A1 | * | 4/2013 | Kountotsis | B08B 7/00 134/8 |
| 2015/0001158 A1 | * | 1/2015 | Valladares | B08B 1/00 210/702 |
| 2016/0009582 A1 | * | 1/2016 | Heimel | C02F 9/00 210/638 |

OTHER PUBLICATIONS

British Stainless Steel Association, Oct. 17, 2007, p. 1.*

* cited by examiner

CLEANING SYSTEMS DEVICES AND PROCESSES

Disclosed is a cleaning system and processes comprising a meter operatively connected to a cleaning device, and where the flow of waste water activates the cleaning device, and which device removes contaminates from the meter.

BACKGROUND

A number of devices and processes are known for the treatment of water, especially waste water. Processes for the treatment of waste water include a series of filtrations in an attempt to remove those substances that are considered contaminates, such as phosphates that pollute creeks, rivers and oceans when the waste water is discharged. Also, water contaminates, such as certain solids contained therein, can cause diseases to plants, animals and humans to the extent that numerous local and federal government regulations have been enacted as to what substances have to be removed from waste water and used water, or to reduce the concentrations of these substances to certain levels, to minimize pollution, to avoid harmful consequences to the earth and to permit the recirculation or environmental discharge of waste water substantially free of undesired contaminates.

Emulsions and latexes continue to be utilized by industry for textiles, paints, papers, toners, adhesives, synthetic resins, rubbers, or the like. The waste water resulting from these processes usually includes therein substances that if not removed will clog the operating apparatus thereby requiring periodic cleaning. Further, uneconomical large quantities of water or manual scrapping are employed to remove the emulsions and latexes adhering onto or remaining in apparatuses, vessels, pipes, or the like, which are used in the above industries. Additionally, in some situations the emulsion or latex adhering to devices is usually not completely removed by washing with water. In the foregoing emulsion or latex processes, an emulsifier like a surfactant and polymers are dispersed in the form of very fine particles of a size as small as a few microns, therefore, when waste water containing such an emulsion or latex is discharged into the environment without any treatment, serious water pollution problems will occur.

In the preparation of emulsion aggregation toners there can be selected a meter that detects contaminates, such as surfactants, and the concentration thereof, which can cause an increase or decrease in the conductivity of the waste water. Depending, for example, on the conductivity values or by visual inspection it can be determined if the conductivity meter is functioning properly, and whether the member needs to be cleaned to prevent the clogging thereof. This cleaning may require costly disengagement of the meter, followed by the manual removal of the solid material contaminates, or in some instances the water conductivity meter may have to be replaced.

When known inorganic or high polymeric coagulants are added to the waste water in order to remove the dispersed resin constituents some problems arise in the removal operation. For instance, when inorganic coagulants containing aluminum or iron compounds are used, formation of flocks takes place on aluminum ions or iron ions as nuclei. Further, in some situations the cohesive force of the resultant flocks is weak, therefore, separation of the formed flocks may be difficult. The use of known organic coagulants may also be unsatisfactory to sufficiently enable the flocculation of solids. For example, when polymer coagulants, which are oppositely charged relative to the emulsion or latex to be treated, are added to cause decomposition of the emulsion or latex, the resin component may be separated and removed from the waste water. However, since the particles of the emulsion or the latex are stably dispersed in the waste water, the sedimentation of the particles coagulated by the use of known coagulants is slow and it is difficult to achieve sufficient waste water purification in a short processing time.

There is a need for water purification systems, devices and processes that substantially avoid or minimize the disadvantages of a number of known processes.

Also, there is a need for economical processes for the removal of contaminants such as toner particles that deposit on water conductivity meters.

There is also a need for devices and processes where clogging or fouling of conductivity meter terminals or sensors is reduced, minimized, or alleviated, while simultaneously avoiding the costly almost daily manual cleaning thereof, and a need for automated self-cleaning systems to reduce or eliminate the time needed for manual cleaning and to not disrupt the processes involved, such as emulsion aggregation toner processes.

Yet another need resides in providing devices and processes that prevent or minimize the fouling of conductivity meters resulting from emulsion aggregation toner methods and to prevent the buildup of fouling materials in conductivity meters by utilizing a mechanical scrubbing action.

Additionally, there is a need for determining the types and amounts of chemicals required to cause the flocculation of waste water solids, and where these solids stick or adhere to the conductivity meter and clog the terminals thereof.

Moreover, there is a need for systems where a water conductivity meter remains free of clogging contaminants, and where there can be rapidly calculated the amount of chemicals to be added to the waste water to flocculate the solids thereof and other substances.

These and other needs are achievable in embodiments with the devices and cleaning processes disclosed herein.

SUMMARY

There is disclosed a cleaning system comprising a meter operatively connected to a cleaning device, and where the flow of waste water activates the cleaning device, and which device removes contaminates from said meter.

There is also disclosed a process for the cleaning of water conductivity meters which comprises providing a cleaning device having attached thereto a cleaning tool, causing the cleaning tool movement by a waste water flow, and where the cleaning tool removes contaminants from the water conductivity meter.

Further disclosed is a water purification system and process comprising a cleaning device, and where the flow of waste water activates the cleaning device; adding to the resulting waste water chemicals that cause the solid contaminates in the waste water to agglomerate, and which chemicals are comprised of at least one of an aluminum halide, a ferric halide, lime, Fullers Earth, a coagulant, and mixtures thereof; adding to the resulting waste water pH controlling additives to assure a pH of the water of from about 5 to about 8, and which pH controlling additives are comprised of an alkali metal hydroxide and an acid; and optionally directing the resulting treated water to micro filters to remove the contaminates.

EMBODIMENTS

In the FIGS. 1 to 4 that follow there are illustrated aspects of the present disclosure, however, these Figures and the descriptions thereof are not limited to these aspects, and rather include other aspects not specifically illustrated such as, for example, water purification systems, devices, and processes.

Figure 1:
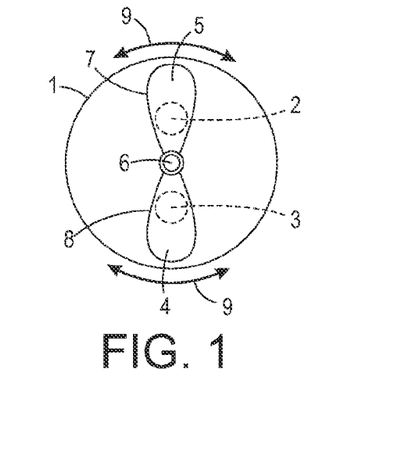
FIGS. 1, 1A and 1B illustrate exemplary embodiments of the systems, devices and processes of the present disclosure.

In FIG. 1, an exemplary embodiment of the present disclosure, there is illustrated an automated self-propelled cleaning device, with the arrows 9, indicating the propellers direction of movement, and which device is comprised of a meter, such as a water conductivity meter 1 with terminals or sensors, such as sensors 2 and 3 that detect water characteristics, such as water conductivity, propellers 4 and 5, attached to the meter 1 at the center position 6 of the meter 1, cleaning blades or cleaning brushes 7 and 8, attached to the bottom sides or surfaces of the propellers 4 and 5, which cleaning blades function to permit their contact with at least the meter sensors 2 and 3.

Figure 1A:
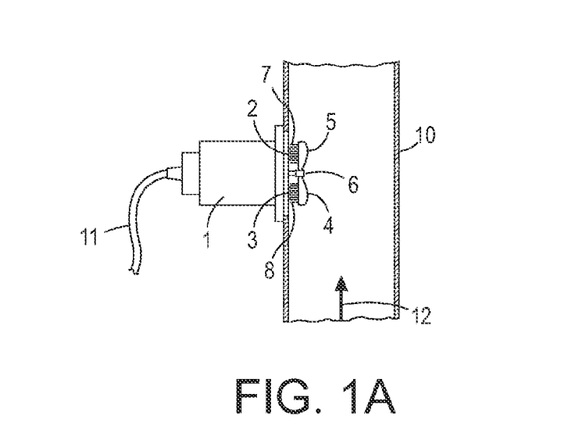

In FIG. 1A, there is illustrated a side view of a meter 1 with sensors 2 and 3, propellers 4 and 5, attached at the center position 6 of the meter 1, cleaning blades or cleaning brushes 7 and 8, attached to the sides or surfaces of the propellers 4 and 5 disposed towards the meter 1, which cleaning blades function to permit their contact with at least the meter sensors 2 and 3, with meter 1 being attached to a receptacle or pipe 10, and waste water flow direction 12, and where the pumped waste water originates, for example, from emulsion aggregation toner processes and an electrical connection or cord 11, that is connected to a power source, and which electrical connection also provides output signals to a server not shown.

Figure 1B:
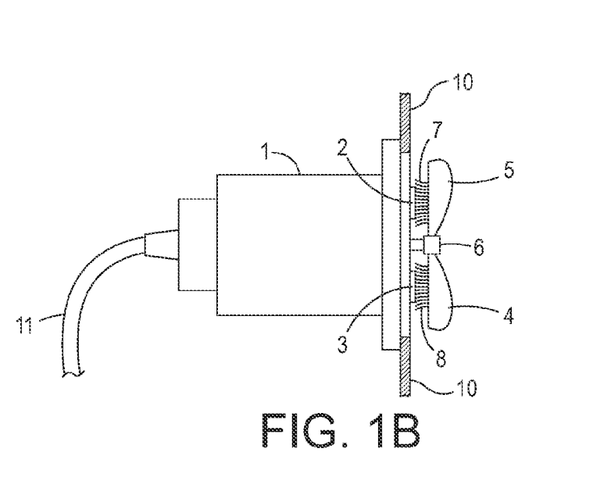

In FIG. 1B, there is presented a side cross-sectional view enlarged relative to FIG. 1A, showing the meter 1 unit with sensors 2 and 3, propellers 4 and 5, attached to center position 6, cleaning blades or cleaning brushes 7 and 8, attached to the propellers 4 and 5, pipe 10, and an electrical connection cord 11, that is connected to a power source, not shown, and which electrical connection provides output signals to a server, not shown.

In operation with the meter 1 of FIG. 1A, a waste water flow of, for example, from about 200 to about 2,000 gallons per minute, from about 200 to about 1,000 gallons per minute, and from about 200 to about 500 gallons per minute, noting that a variety of waste water flow gallons not specifically disclosed herein can be selected depending, for example, on the device components and construction, and the diameter of the conduit or water transport pipes, and which waste water contacts the propellers 4 and 5, causing the propellers to move and oscillate and allowing the cleaning blades or cleaning brushes 7 and 8 to remove, and more specifically, by a mechanical scrubbing action removed from the meter 1 residual substances and contaminants like surfactants, cleaning fluids, solvents, acids, alkali hydroxides like sodium hydroxide, toner particles, pigments, dyes, nitric acid, antifoams, and other substances generated, for example, subsequent to completion of toner emulsion aggregation processes. The propellers 4 and 5, sufficiently pitched relative to the flow 12, as to be caused by the waste water flow 12, to move in an arc of 360 degrees, and more specifically, from about 40 to about 55 degrees, from about 35 to about 50 degrees and yet more specifically, about 45 degrees, and where the propellers 4 and 5 continuously move up and down and back and forth with the blades or brushes 7 and 8 cleaning the meter 1, and more specially, cleaning and removing contaminates from meter sensors 2 and 3 for every radius completion movement of the propeller blades 4 and 5.

Figure 2:
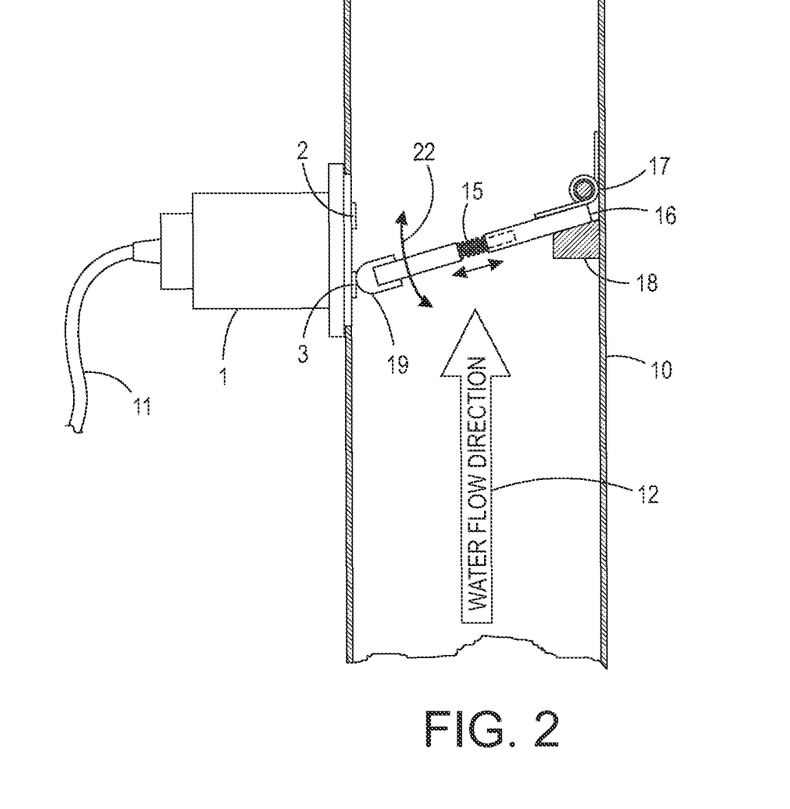
FIG. 2 illustrates exemplary embodiments of the systems, devices, and processes of the present disclosure.

In FIG. 2 there is illustrated a meter 1, with terminals or sensors 2 and 3, and which meter is attached to a receptacle or pipe 10 from, for example, about 2 to about 6 inches in diameter, from about 3 to about 5 inches in diameter, and more specifically, about 4 inches in diameter, where the pipe 10 has situated therein a support rod, such as a metal rod 16, with affixed spring 17, attached to the pipe 10, and the rod 16, and stopper component 18, attached to the pipe 10, and the rod 16, a blade or brush 19, affixed to the rod 16, moving in the direction as indicated by arrows 22, pumped waste water flow direction 12 and an electrical connection or cord 11, that is connected to a power source, and which electrical connection or cord provides output signals to a server, not shown. The spring 17 can have one end fixed downstream from the meter, and the other end, with the attached brush or blade 19, moving freely in the pipe or container 10. The waste water 12, the volume of which is illustrated herein with reference to FIG. 1A, will exert a force upon or push the spring 17, upward (some resistance designed in to compress the spring), thus swiping the cleaning blade or cleaning brush over sensors 2 and 3 of the meter. Also, a second spring 15, may be included in support rod 16. The second spring 15, permits, for example, a flexing action to the rod 16 which allows minimum or no breakage of the rod for extended time periods and further control of the movement of the rod 16 by the waste water 12. Once the water flow ceases, the spring 17 will push the cleaning blade or cleaning brush 19 down to the stopper 18, thus cleaning sensor 3, and the entire meter 1 a second time.

Figure 3:
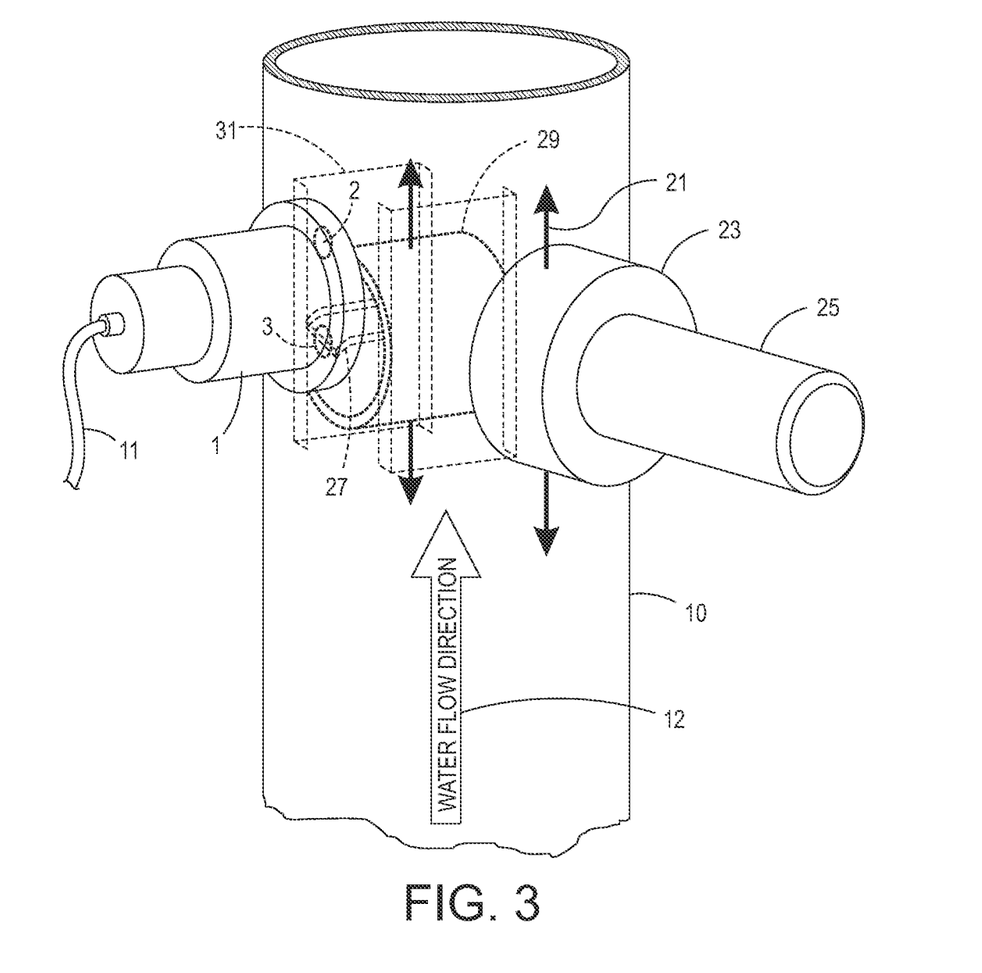
FIG. 3 illustrates further exemplary embodiments of the systems, devices, and processes of the present disclosure.

FIG. 3 illustrates a meter 1, with terminals or sensors 2 and 3, a non-magnetic container, tubing, or pipe 10, waste water flow 12, the volume of which is described herein with reference to FIG. 1A, a strong magnet 23, a handle 25, arrows 21, that illustrate the movement directions of the magnet 23, a cleaning blade or brush 27, an enclosure 29, alignment or guiding rails 31, and an electrical connection or cord 11, that is connected to a power source, not shown, and which electrical connection also provides output signals to a server not shown.

Figure 4:
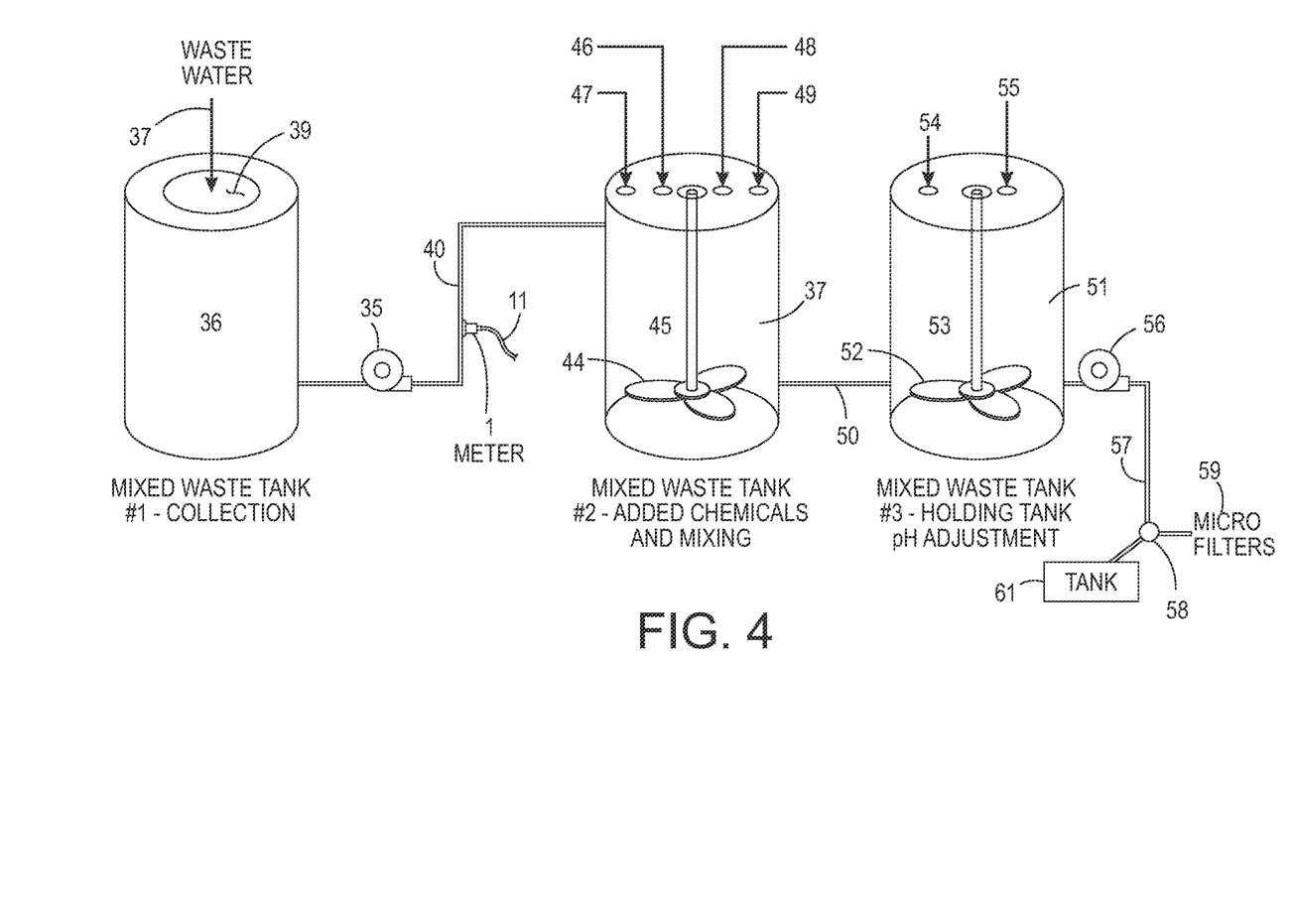
FIG. 4 illustrates further exemplary embodiments of the systems, devices, and processes of the present disclosure.

The cleaning blade, such as a known magnetic stainless steel ferritic or a known martensitic stainless steel blade or brush 27, is attached to enclosure 29, and which attachment enables the cleaning brush or blade 27 to move along the axis of the enclosure 29, and wherein the rails or guides 31, properly align the movement of the blade or brush 27, and which rails or guides minimize the twisting action of the blades or brush 27. The external strong magnetic translating unit 23 is activated by handle 25, with the magnet being strong enough to actuate cleaning of the meter 1. When the performance of the meter is suspected to be in question, the operator can easily clean the meter without opening the pipe 10, and holding up production by accomplishing the manipulating of the handle by an operator that grasps the handle and moves it in different directions, and thereby removing contaminates of solids from the meter and subsequently adding in sequence, as illustrated in FIG. 4, treatment chemicals to the resulting water. The treatment chemicals, which can be added to the resulting water in various effective amounts, such as for example, from about 250 parts per million to about 500 parts per million, are comprised of aluminum halides, ferric halides, lime, Fullers Earth, coagulants, and mixtures thereof. Subsequently, there is added the water resulting pH controlling additives, and then directing the resulting water with aggregated contaminated solids therein to micro filters that remove the contaminated solids.

Alternatively the device of FIG. 3 can be converted into a non-intrusive automatic cleaner with computer programming and by adding an external motor.

FIG. 4 illustrates aspects of the present systems, devices and processes where waste water container or tank 36 contains pumped contaminated waste water 37 therein that enters by, for example, opening 39, which waste water originates from the completion of an emulsion aggregation toner process or other toner processes, and which waste water is directed by gravity or at least one pump 35 via conduit 40, into container or tank 45, with the meter 1, of FIG. 1, 2, or 3, being attached to conduit 40, in a manner that allows the meter 1, with an electrical connection or cord 11, that is connected to a power source, and which electrical connection also provides output signals to a server not shown, to detect the characteristics, such as the conductivity values of the waste water. Pipe or conduit 40 directs the waste water 37, by pump 35, to the container or tank 45, and where the tank includes a stirring propeller 44 that continuously mixes the waste water 37, to permit the contaminated particles present to remain dispersed in the water, however, the propellers can be disengaged and the solid contaminated aggregated particles which are allowed to settle as a result of gravity can be removed. There is added to the waste water 37, through the openings 46, 47, 48, and 49, the disclosed chemical treatment substances in the manner and amounts illustrated herein, and which substances permit the contaminated solids present in the waste water to flocculate into a number of merged particles, aggregated particles, and clumps. The resulting contaminated aggregated particles and clumps can be permitted to settle in container 45 by disengaging the propellers 44, and these particles can be removed by a number of known methods, such as disengaging the water flow and simply emptying the container and directing the solids to a device that heats them causing the contaminates to aggregate further with the resulting aggregates being used, for example, as an energy source.

Alternatively, with engagement of propeller 44, the treated waste water 37, with dispersed contaminated particles therein, can be directed by gravity or a pump, not shown, from container 45 to container 53 by conduit or pipe 50, and where container 53 includes the treated waste water 51. The container 53 contains therein mixing propellers 52, continuously mixing the treated water, and where chemical additives are added in openings 54 and 55, which additives include, for example, alkali hydroxides like sodium hydroxide, acids, such as sulfuric acid, and the like to control and adjust the pH of the water. Generally, the additives introduced into container 53 via the openings 54 and 55 can be added in sufficient amounts to assure an acceptable and governmental approved water pH of, for example, from about 5 to about 8, from about 6 to about 7, and more specifically, about 7 as measured with a known pH meter. The water can then be directed by pump 56, via the conduit or pipe 57, to a series of micro filters or a cross flow microfiltration unit 59, commercially available, to remove solid contaminates, or in instances where the contaminates are allowed to settle in container or tanks 2 and 3 the pump 56, and the micro filters 59 may not be engaged. The control valve 58 directs the treated and purified water to micro filters 59 or tank 61, and then the treated water free or substantially free of contaminated solids can be discharged to a public sewer, or the treated waste water can be recycled for use in, for example, the emulsion aggregation toner processes illustrated herein. Alternatively, the contaminated sediments and solids that may settle in container 53 can be removed as indicated herein with reference to container 45, where these solids and sediments are removed by emptying the tank 53. These solids can then be directed via pipe 57 to tank 61, heated, and cooled to agglomerate the particles, and used as energy sources.

The meter 1, such as a water conductivity meter 1, which is able to detect conductivity values of, for example, from zero (0) to about 10,000 micro Siemens/cm (µS/cm), and more specifically, from about 100 to about 10,000 micro Siemens/cm, from about 200 to about 7,000 micro Siemens/cm, from about 200 to about 7,000 micro Siemens/cm, and from about 200 to about 500 micro Siemens/cm, reveals what further treatment of the waste water may be needed to flocculate the undesirable contaminates therein and to determine the type and amount of chemicals to be added to flocculate the waste water contaminates resulting from toner processes such as emulsion aggregation toner processes. The meter conductivity values directly correlate to the total dissolved solids in the waste water, thus a reading of, for example, about 7,000 micro Siemens/cm, indicates that a higher dosage, such as about 500 to about 600 parts per million, of treatment chemicals are to be used, and a reading of, for example, below about 100 micro Siemens/cm, indicates a lower amount, such as for example, about 200 parts per million of treatment chemicals are to be added to the waste water for the flocculation of contaminates therein. Yet more specifically, for example, a low water conductivity reading of about 60 µS/cm indicates that a small amount of treatment chemicals should be added, while with a high water conductivity meter reading of above about 7,000 µS/cm indicates a larger amount of chemicals are to be added to the waste water. When not enough chemicals are added, the water waste contaminates will not completely flocculate, and the waste water will not be fully treated. Additionally, when there is a buildup of contaminates on the meter over its usage this adversely affects the accuracy of the meter readings resulting in waste water that is not fully treated for the removal of contaminates. In embodiments of the present disclosure, samples of contaminates can be removed from the meter to determine the specific components of the contaminates by known analytic methods and by FTIR evaluation.

The conductivity directly correlates to the concentrations of solids in the feed water, thus a high reading needs a higher dosage amount of chemicals. Also, some contaminated materials can adhere to the conductivity meters and clog their terminals. When this happens, the reading is very low, for example, the low reading was about 60 µS/cm when the water was dirty, that is it contained unacceptable contaminates as determined by governmental agencies and around 2,000 µS/cm after cleaning. If not enough chemicals are added, the solids will not completely flocculate, which could plug the micro filter membranes.

Treatment Chemicals

A number of chemicals can be added to the waste water via openings 46, 47, 48, and 49 of FIG. 4 to induce and complete flocculation of the contaminates, inclusive of those contaminates resulting from the components selected for emulsion aggregation processes such as silicas, toner particles, wax, hydrocarbon oils, antifoams, stabilizers, surfactants, mixtures thereof, and the like present in the waste water to thereby result in purified or acceptable governmental approved clean water that can be discharged or recycled.

Examples of treatment chemicals added to openings 46, 47, 48, and 49 of FIG. 4 include aluminum halides, such as aluminum chloride, ferric halides, such as ferric chloride, lime or calcium hydroxide, Fuller's Earth, coagulants, such as aluminum sulfate, polyaluminum chloride, and the like, and organic polymer coagulants, such as polyacrylic amide, polyacrylic acid, and the like, soda ash, fly ash, anhydrides or hydrates of iron salts, such as ferrous chloride, ferric chloride, ferrous bromide, ferric bromide, ferrous nitrate, ferric nitrate, ferrous sulfate and ferric sulfate, and anhydrides or hydrates of magnesium salts, for example, magnesium chloride, magnesium bromide, magnesium nitrate and magnesium sulfate, and mixtures thereof.

The treatment chemicals can be added to the waste water in various effective amounts as disclosed herein. These amounts, which may be determined by a computer that correlates the amounts of treatment chemicals to the water conductivity meter readings are, for example, from about 100 to about 700 parts per million, from about 250 to about 700 parts per million, from about 250 to about 500 parts per million, from about 200 to about 500 parts per million, from about 200 to about 400 parts per million, from about 250 to about 375 parts per million, from about 275 to about 350 parts per million, and from about 300 to about 325 parts per million.

In embodiments, and specifically with reference to the Figures, when the meter readings indicate a waste water conductivity of, for example, between about 200 to about 7,000 μS/cm, a preprogramed computer determines the amounts of the disclosed treatment chemicals to be added such as the amounts disclosed herein. Yet more specifically, with a water conductivity reading of between about 100 to about 5,000 there is added to the waste water treatment chemicals in amounts of between about 250 parts per million to about 700 parts per million or from about 100 parts per million to about 500 parts per million. For meter readings of from about 200 to about 7,000, inclusive of readings of 200, 250, 300, 350, 375, 400, 500, 575, 625, and 695 from, for example, about 200 to about 700 parts per million of treatment chemicals, inclusive of amounts of 250, 275, 300, 325, 350, 375, 400, 425, 450, 475, 490, 500, 575, 600, 675, and 700 parts per million are added to the waste water. The correlation between the meter readings of, for example, conductivity and the amounts of treatment chemicals added can be determined by a preprogramed computer, and these values can be less or more than those disclosed depending, for example, on factors relating to the meter clogging amounts, emulsion aggregation toner process components, the device sizes, the water flow volumes, and the like.

A number of waste water chemical treatments can be accomplished, depending on a number of factors, such as the clogging extent of the water conductivity meter, however, in embodiments from about zero to about 15 treatments, from about 1 to about 12 treatments, and from about 8 to about 10 treatments per day may be instituted.

Waste Water Sources

The systems, devices, and processes disclosed herein can be selected in a number of appropriate situations, such as for example, whenever waste water with unacceptable contaminates result, and in the preparation of toner particles by emulsion/aggregation/coalescence, and where large amounts of water are used and where waste water is generated. Emulsion aggregation processes typically involve the formation of emulsion latex of the resin particles, which particles have a small size of from, for example, about 5 to about 500 nanometers in diameter, by heating the resin, optionally with solvent if needed, in water, or by preparing a latex in water using emulsion polymerization. A colorant dispersion, for example of a pigment dispersed in water, optionally also with additional resin, is separately formed. The colorant dispersion is then added to the emulsion latex mixture, and an aggregating agent or complexing agent is then added to form aggregated toner particles. The aggregated toner particles are heated to enable coalescence/fusing, thereby achieving aggregated, fused toner particles. United States Patents describing emulsion aggregation toners include, for example, U.S. Pat. Nos. 8,383,311, 8,137,884, 5,370,963, 5,418,108, 5,290,654, 5,278,020, 5,308,734, 5,344,738, 5,403,693, 5,364,729, 5,346,797, 5,348,832, 5,405,728, 5,366,841, 5,496,676, 5,527,658, 5,585,215, 5,650,255, 5,650,256, 5,501,935, 5,744,520, 5,763,133, 5,766,818, 5,747,215, 5,827,633, 5,853,944, 5,804,349, 5,840,462, and 5,869,215, the disclosures of each of these patents being totally incorporated herein by reference. Waste water resulting from the toner emulsion/aggregation/coalescence processes are treated in accordance with the systems, devices, and processes disclosed herein.

A number of advantages are associated with the systems, devices, and processes of the present disclosure. Examples of these advantages include that the devices and processes presented herein, inclusive of the Figures, are non-intrusive in that the meters described can be cleaned automatically repeatedly, and continuously without the need for human or user intervention, that is there is dispensed with operator interaction on a day to day basis, and without terminating the waste water flow, and there is avoided the need to open an access port to clean the meter which would render toner processes inefficient and costly. Further, with the devices and processes disclosed substantially maintenance free meter cleaning blades or cleaning brushes can be utilized, the meters, especially the sensors thereof, employed are effectively cleaned, and where in embodiments up to 100 percent of the contaminates are removed. Additionally, with the systems, devices and processes of the present disclosure, there are enabled reliable accurate meter readings for extended time periods, excellent reliable readings of the waste water solid contaminated contents, the addition and timing of the correct amount of treatment chemicals to be utilized, and the amount and type of pH adjusting or controlling chemicals to be added to the waste water, and the generation of clean purified water that conforms to governmental regulations that allows the water to be released to the environment, to be recycled, or where some of the water is released and some of the water is recycled.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A cleaning system comprising a water conductivity meter operatively connected to a cleaning device that includes at least one propeller blade attached to a cleaning tool, or, at least one brush attached to said cleaning tool and where the flow of waste water activates the cleaning device, thereby causing movement of said at least one propeller blade, or thereby causing movement of at least one brush;
   a. wherein said at least one brush comprises two brushes;
   b. wherein said at least one propeller blade comprises two blades;
   c. wherein said cleaning device removes contaminates from said meter, and wherein there is added to said waste water aluminum halides, ferric halides, lime, Fullers Earth, coagulants, and mixtures thereof, followed by the addition of pH controlling additives of an alkali metal hydroxide and an acid.

2. A cleaning system in accordance with claim 1 wherein said two blades move in an arc from about 35 to about 50 degrees.

3. A cleaning system in accordance with claim 1 wherein said waste water flow is from about 200 to about 2,000 gallons per minute.

4. A cleaning system in accordance with claim 1 where said waste water is generated from emulsion/aggregation/coalescence toner processes and wherein there is included the addition of said pH controlling additives of an alkali metal hydroxide and an acid, and wherein the water resulting is directed to micro-filters that remove solid aggregated contaminates, and subsequently there is discharged or recycled purified water free of contaminates.

5. A cleaning system in accordance with claim 1 wherein when the water conductivity meter has a reading of from about 200 to about 7,000 micro Siemens/cm there is added to the waste water in an amount of from about 200 parts per million to about 500 parts per million, said aluminum halides, ferric halides, lime, Fullers Earth, coagulants, and mixtures thereof.

6. A cleaning system in accordance with claim 1 wherein said cleaning device is comprised of said water conductivity meter attached to a receptacle that contains a support therein with a spring attached thereto, and wherein said waste water flow activates the spring, and wherein the support member with an attached cleaning blade or cleaning brush contacts and cleans said water conductivity meter.

7. A cleaning system in accordance with claim 6 where said spring controls the up and down movement of the support member, and where a stopper prevents the support member from movement when the water flow is disengaged.

8. A cleaning system in accordance with claim 6 wherein the support member is comprised of a steel rod, and said steel rod has attached thereto a cleaning blade that removes contaminates from the water conductivity meter.

9. A cleaning system in accordance with claim 6 wherein said waste water flow is from about 200 to about 2,000gallons per minute.

10. A cleaning system in accordance with claim 6 wherein when the water conductivity meter has a reading of from about 200 to about7,000 micro Siemens/cm there is added to the waste water treatment chemicals in an amount of from about 200 parts per million to about 700 parts per million.

11. A cleaning system in accordance with claim 10 where said waste water results from emulsion/aggregation/coalescence toner processes, said cleaning device cleans and removes contaminates from said water conductivity meter sensors, and wherein the resulting water has added thereto said aluminum halide, said ferric halide, said lime, said Fullers Earth, said coagulant, or said mixtures thereof, followed by the addition of pH controlling additives of a alkali metal hydroxide and an acid, and wherein the water resulting is directed to micro-filters that remove solid aggregated contaminates, and subsequently there is discharged or recycled purified water free of contaminates.

12. A cleaning system in accordance with claim 1 wherein said cleaning device is comprised of said water conductivity meter attached to a receptacle or a chamber that includes openings, a said cleaning blade or a said cleaning brush, a magnet attached to said meter and a handle that permits the manual movement of said magnet and said cleaning blade or said cleaning brush.

13. A process for the cleaning of water conductivity meters consisting essentially of providing a cleaning device having attached thereto a cleaning tool, causing the cleaning tool to move by a waste water flow, and where the cleaning tool removes contaminants from the water conductivity meter and wherein said waste water flow is from about 200 to about 2,000 gallons per minute and wherein there is added to said waste water treatment chemicals of aluminum halides, ferric halides, lime, Fullers Earth, coagulants, and mixtures thereof, followed by the addition of pH controlling additives of an alkali metal hydroxide and an acid.

14. A process in accordance with claim 13 wherein subsequent to said cleaning of said water conductivity meter said waste water flow has added thereto said treatment chemicals in an amount of from about 250 parts per million to about 500 parts per million to enable flocculation of solid contaminates present in said waste water, and which amount is computer determined by the water conductivity meter reading values of from about 200 to about 7,000 micro Siemens/cm.

15. A process in accordance with claim 13 wherein the cleaning tool is comprised of propeller blades having attached thereto a cleaning brush or a cleaning blade, or wherein the cleaning tool is comprised of a spring attached to a support member that contains a cleaning blade or a cleaning brush attached to said support member; wherein said cleaning brush comprises two brushes; wherein said cleaning blade comprises two blades.

16. A process in accordance with claim 13 where the waste water flow of from about 200 to about 2,000 gallons per minute causes the cleaning tool to automatically and continuously move, permitting said cleaning tool of a cleaning blade or a cleaning brush to remove contaminates from said water conductivity meter; wherein said cleaning brush comprises two brushes; wherein said cleaning blade comprises two blades, and subsequently adding said treatment chemicals to said resulting waste water flow, and which treatment chemicals are added in an amount of from about 100 parts per million to about 500 parts per million, and which chemicals are comprised of aluminum halides, ferric halides, lime, Fullers earth, coagulants, and mixtures thereof, thereby resulting in water that is substantially free of contaminates.

17. A process in accordance with claim 16 wherein said water flow is from about 200 to about 500 gallons per minute, said aluminum halide is an aluminum chloride, and said ferric halide is a ferric chloride.

18. A waste water purification process comprising:
   a. providing a cleaning device for cleaning a water conductivity meter having attached thereto a cleaning tool, that includes at least one propeller blade attached to said cleaning tool, or, at least one brush attached to said cleaning tool, wherein the flow of said waste water causes the cleaning tool to move; wherein said at least one propeller blade comprises two blades; wherein said at least one brush comprises two brushes;
   b. adding to said waste water chemicals that cause solid contaminates in said waste water to agglomerate, wherein the chemicals are comprised of at least one of an aluminum halide, a ferric halide, lime, Fullers Earth, a coagulant, and mixtures thereof;

c. adding pH controlling additives to ensure a pH of said water of from about 5 to about 8, and which pH controlling additives are comprised of an alkali metal hydroxide and an acid; and directing the resulting treated water to micro filters to remove said contaminates and wherein said waste water flow is from about 200 to about 2,000 gallons per minute.

* * * * *